Sept. 22, 1936.  C. B. COATES  2,055,337
AIR-COOLED MOTOR
Filed Jan. 4, 1933
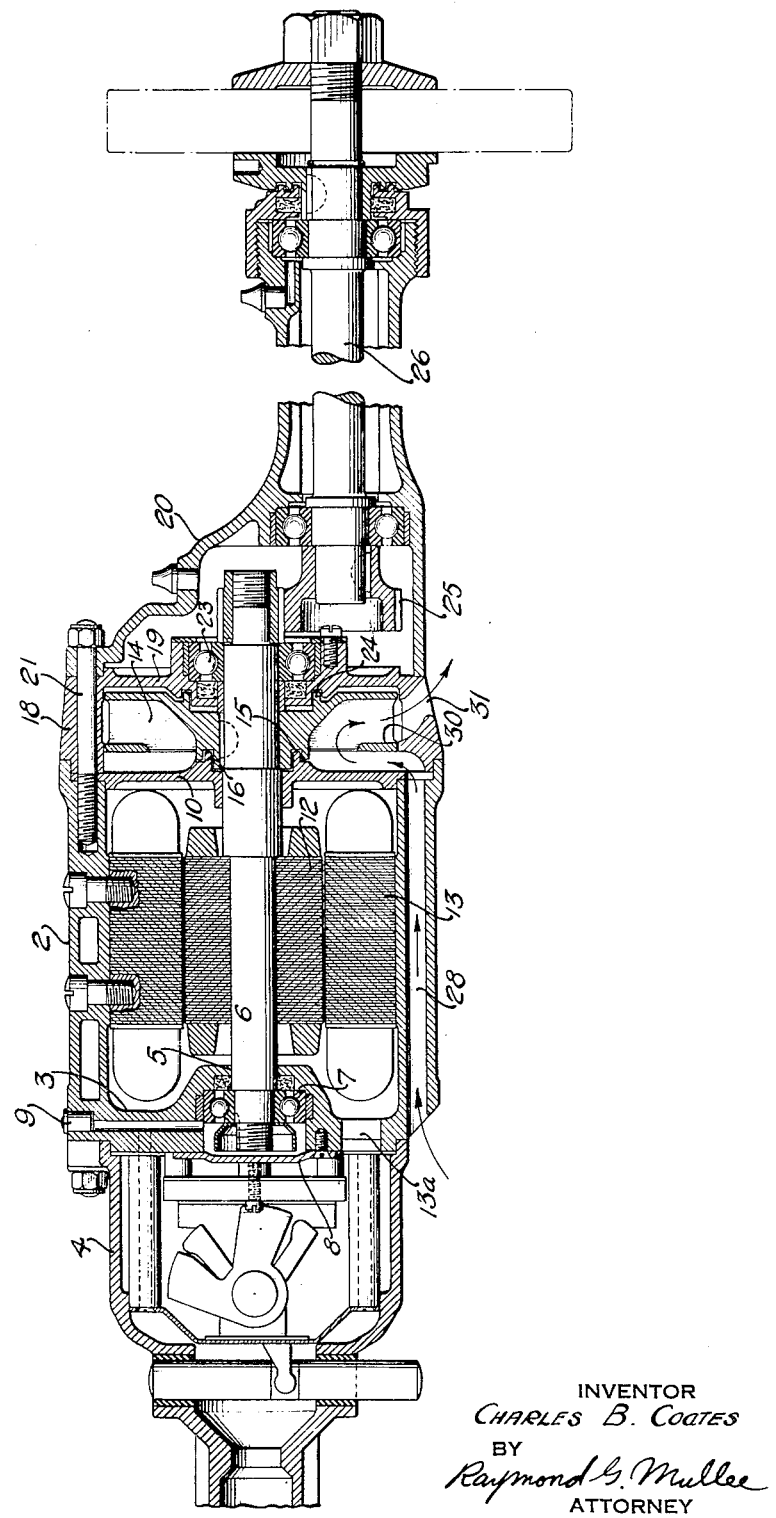
INVENTOR
*Charles B. Coates*
BY
*Raymond G. Mullee*
ATTORNEY Patented Sept. 22, 1936

2,055,337

UNITED STATES PATENT OFFICE 2,055,337

AIR-COOLED MOTOR

Charles B. Coates, Cleveland, Ohio, assignor to Chicago Pneumatic Tool Company, New York, N. Y., a corporation of New Jersey Application January 4, 1933, Serial No. 650,064

2 Claims. (Cl. 172—36)

The present invention relates to a cooling arrangement for motors and has particular application to electric motors exposed to sand, grit, etc. The general object of the invention is to cool a motor of the type described by means of circulating air but in a dust-proof manner.

Electric grinders used in foundries, and in similar industries where there is much sand and grit in the grinding rooms, are usually short lived. This is due to dirt being pulled into the bearings and the windings, which destroy them in a comparatively short time. Motors of the portable type are usually air cooled, and the circulating air adds to the problem of keeping the dirt out of the bearings. An object of the present invention is to overcome this difficulty by making the windings and bearings fully enclosed and providing ventilating means outside of the enclosure but in thermal contact with the motor stator.

Another object of the invention is to adapt a cooling system of the type described, to be used in a machine tool which has a gear transmission or speed reduction unit on the same axis of the motor. It is old to cool an enclosed motor by means of a fan which drives the air in an axial direction through passages disposed about the periphery of the motor. If, in such a system, a gear reduction unit were disposed in line with the fan, the latter, being connected to atmosphere, would ordinarily cause the exposure of the gears and their bearings to the dust. In the present invention, however, the gear reduction unit, as well as the motor is protected in a novel manner, since both are enclosed separately.

A further object of the invention is to provide a fan construction which draws air from an axial passage, diverts the same inwardly toward the axis and then forces it out. The fan, by forcing the air outwardly, rather than axially, permits the gear case to be of the same diameter as the motor.

Other objects and features of the invention will appear more clearly from the following description, taken in connection with the accompanying drawing and appended claims.

The drawing shows, in a sectional view, the invention applied to a portable electric tool, such as a grinder. The motor housing 2 is cylindrical and has an integral back end 3, to which is bolted the switch case 4. The back end is apertured at 5 to receive the rotor shaft 6. Seated in a counterbore in the aperture 5 is the bearing 7 for the rotor shaft. The bearing is enclosed in an airtight manner by the plate 8, secured to the back end. The bearing may be lubricated either through the oiler 9 in the back end, or by packing the bearing enclosure with grease. The front end of the housing 2 is closed by the end wall or diaphragm 10 which receives the rotor shaft 6 with a close-running fit. The housing 2, back end 3 and diaphragm 10 combine to form a totally-enclosed chamber for the motor, which comprises the stator 13 and rotor 12. The motor cables may pass from the switch case to the motor through a tight rubber gasket at 13a.

Outside of the motor chamber, and keyed to the rotor shaft 6, is a fan 14, having an annular groove 15 rotatably receiving a rib 16 on the diaphragm 10 to form a labyrinth seal. The fan is disposed within a fan housing 18 which has a radial wall 19. Cooperating with the wall 19 to form an enclosed chamber is an arbor housing or gear case 20. The arbor housing and fan housing are secured to each other and to the motor housing 2 by means of bolts 21 and suitable check fits. The radial wall 19 is apertured to receive the front bearing 23 for the rotor shaft 6. In order to exclude dust from this bearing, the latter is sealed by a labyrinth connection 24 formed by cooperating surfaces on the fan 14 and wall 19 respectively. Enclosed within the gear case 20, may be any suitable system of gears such as the gear reduction unit 25 for transmitting rotation from the rotor shaft 6 to the tool spindle 26.

The air cooling system comprises a series of ducts or passages, such as 28, extending through the cylindrical walls of the motor housing 2 and leading from the back end of the housing to the chamber formed within the fan housing 18. The fan 14 is preferably made in one piece and consists of a series of blades to which is united a deflector ring 30. The deflector ring has a sliding fit on its periphery with the fan housing 18 and is spaced from the diaphragm 10. The fan housing is provided with one or more radially extending openings 31, by means of which the fan blades communicate with the atmosphere.

In operation, the fan 14 rotates with the motor shaft 6 and draws air through the motor housing passages 28, which are in close contact with the stator core 13. The deflector ring 30 diverts the air toward the motor axis, from whence the fan blades drive the air through the opening 31. As will be apparent from the foregoing description none of the air passages is in communication with the inside of either the motor housing 2, the switch case 4, or the gear case 20. Even the bearings for the fan itself are protected by the labyrinth connections. As a result any sand or grit thrown into the air by the grinder, will not cause injury to the parts of the machine.

The arrangement of the fan to draw air through the passages 28 rather than drive it through, has the advantage that the air is introduced to the machine at a point more remote from the grinding wheel, and hence is less gritty. Furthermore, it prevents the annoyance of blowing sand, etc. toward the operator.

While the invention has been herein disclosed in what is now considered to be a preferred form, it is to be understood that the invention is not limited to the specific details thereof, but covers all changes, modifications and adaptations within the scope of the appended claims.

I claim as my invention:

1. A portable electric driven tool for grinding, polishing, or the like, comprising a motor housing, a gear housing axially spaced therefrom, a motor enclosed in said motor housing and surrounded by a peripheral wall thereof, said peripheral wall being constructed in one piece, a shaft connected to the motor and extending into the gear housing, the adjacent end walls of said housings providing bearings supporting the shaft, a ventilating passage extending along the peripheral wall of the motor housing, a fan mounted upon the motor shaft between said housings, the interiors of both housings being totally enclosed in a dust-proof manner and out of communication with the fan and ventilating passage, whereby cooling of the motor may be effected without blowing dust into the housings, the fan being in a housing having at its periphery an atmospheric port and another port communicating with the peripheral motor housing passage, said fan having a deflector adapted to cause first inward and then outward movement of air in circulating from one port to the other.

2. A portable electric driven tool for grinding, polishing, or the like, comprising a motor housing, a gear housing axially spaced therefrom, a motor enclosed in said motor housing, a shaft connected to the motor and extending into the gear housing, the adjacent end walls of said housings providing bearings supporting the shaft, a ventilating passage extending along the periphery of the motor housing, a fan mounted upon the motor shaft between said housings, the interiors of both housings being totally enclosed in a dust-proof manner and out of communication with the fan and ventilating passage, whereby cooling of the motor may be effected without blowing dust into the housings, the fan being of sufficient thickness at its central portion to extend from an end wall of the motor housing to an end wall of the gear housing, the fan and the respective end walls being provided with interfitting annular projections to exclude dust from the bearings for the motor shaft.

CHARLES B. COATES.